April 12, 1966  M. BENTELE  3,245,386

SEAL LUBRICATION FOR ROTARY ENGINES

Filed Oct. 29, 1962  4 Sheets-Sheet 1

INVENTOR.
MAX BENTELE

BY

Thomas W. Kennedy
ATTORNEY

April 12, 1966　　　　M. BENTELE　　　　3,245,386
SEAL LUBRICATION FOR ROTARY ENGINES
Filed Oct. 29, 1962　　　　　　　　　　4 Sheets-Sheet 2

INVENTOR.
MAX BENTELE
BY
*Thomas W. Kennedy*
ATTORNEY

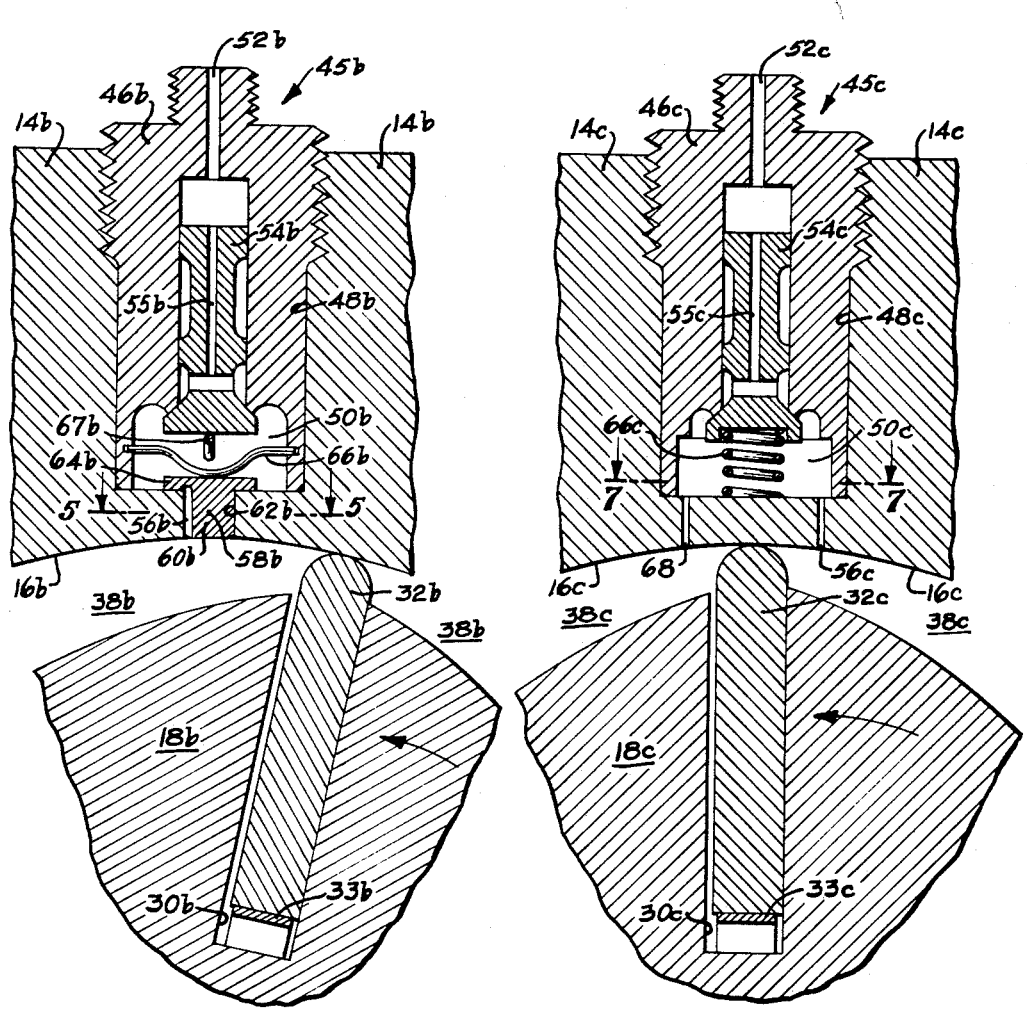
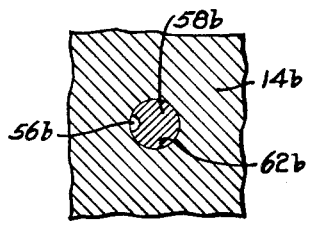
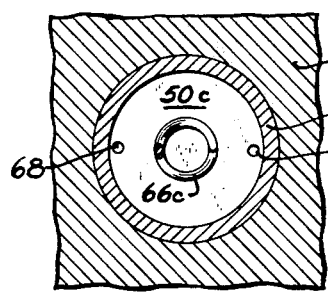

April 12, 1966   M. BENTELE   3,245,386
SEAL LUBRICATION FOR ROTARY ENGINES
Filed Oct. 29, 1962   4 Sheets-Sheet 4

INVENTOR.
MAX BENTELE
BY
Thomas W. Kennedy
ATTORNEY

United States Patent Office 3,245,386
Patented Apr. 12, 1966

3,245,386
SEAL LUBRICATION FOR ROTARY ENGINES
Max Bentele, Ridgewood, N.J., assignor to Curtiss-Wright Corporation, a corporation of Delaware
Filed Oct. 29, 1962, Ser. No. 233,561
3 Claims. (Cl. 123—8)

The present invention relates broadly to the art of rotary mechanisms and is particularly directed to lubrication means for the sealing means for such rotary mechanisms.

The invention is particularly useful in connection with rotary mechanisms similar to that disclosed in United States Patent Number 2,988,065, although as will become apparent, this invention is not limited to this specific type of rotary mechanism. In the following description the invention is described in relation to an internal combustion engine, but the invention is also suitable for fluid pumps and fluid motors.

A rotary engine as disclosed in said patent comprises an outer body or housing having a cavity therein and an inner body or rotor disposed therein rotatable relative to the outer body, about an axis laterally spaced from, but parallel to the axis of said cavity. The inner body is journaled on an eccentric portion of a shaft which is coaxial with the outer body and journaled in bearings carried by the outer body end walls. The outer body has axially-spaced end walls and a peripheral wall interconnecting the end walls to form said cavity; the inner surface of the cavity peripheral wall having a multilobed profile which is preferably basically an epitrochoid. The inner body or rotor has end faces disposed adjacent to said outer body end walls for sealing cooperation therewith, and has a peripheral surface with a plurality of circumferentially-spaced apex portions, each carrying a radially-movable seal or seal means for sealing engagement with the multilobed inner surface of the outer body peripheral wall to form a plurality of working chambers between the two bodies which vary in volume upon relative rotation of the two bodies. Each apex seal of the inner body runs axially, separating the adjacent working chambers, and is received within an outwardly-facing groove running axially from one end face to the other of the inner body at its associated apex portion on the inner body. During rotation of the inner body, the apex seal means slide continuously along with their outer edges in bearing against the inner surface of the peripheral wall.

In certain prior Otto-type combustion engines the combustion chamber seal lubrication has been effected by mixing oil in the engine fuel. This, however, is not always desirable. This method causes high oil consumption because a large part of the oil is burned or exhausted before reaching the apex seal and inner surface.

In the past, in an attempt to avoid mixing oil to the fuel, it has been proposed for both Otto-type and diesel-type engines to supply metered oil to the apex seal through the rotor. Such oil supply through the rotor is subject to relatively higher rotor temperatures and therefore coking of the oil in the rotor oil passages may occur. Mechanisms in the rotor, including their valves and springs, are also subject to high and variable acceleration forces so that it is difficult to design such a mechanism, which can operate effectively. In addition, since each apex portion requires its own separate mechanism, control of the oil becomes a complex problem.

An object of the present invention comprises the provision of a rotary combustion engine in which a novel lubricating means for the apex seals is provided to improve seal lubrication and without excessive use of the lubricating medium.

Specifically, instead of mixing oil to the fuel or pumping oil through the rotor and out through the grooves of the apex seals, this invention provides passage means with valve means which is disposed in the housing and preferably in its peripheral wall, and which automatically supplies oil to a port in the peripheral-wall inner-surface in intermittent releases, timed by the valve means to occur once for each rotor apex passing the oil port.

Thus, relatively cool oil is supplied directly to the apex seal engaging surfaces requiring lubrication, such as between the inner surface of the peripheral wall and outer edges of the apex seals and also between the side faces of the apex seals and their adjacent groove walls, and is released in a timed and efficient manner so that the oil is not burned or exhausted before reaching these surfaces. Further, the lubricating oil supply is regulated to the engine speed, and this also reduces oil wastage particularly under varying speeds.

Another object of the invention is to furnish a multiple-sensing valve means which is simultaneously regulated by the gas pressures in the working chambers as well as by the rotor speed, thereby regulating the quantities of oil released in proportion to the engine load as well as regulating the flow of the oil supply in accordance with the engine speed so that oil consumption is controlled in accordance with engine loads and speeds.

Still another object is to furnish an apex-seal lubricating means which is operated and controlled by the apex seal itself.

A further object is to furnish an apex-seal lubricating means which is operated and controlled by varying chamber gas pressure occuring adjacent to one region of the inner surface of the housing of the rotary mechanism.

A still further object is to furnish an apex-seal lubricating device having flow control means with no moving parts.

An additional object is to furnish rotor-seal lubricating means which can be an integral part of a stationary housing wall of the rotary mechanism.

Still another object is to furnish a novel integral pump and metering arrangement located near the point of oil injection.

Other objects of the invention will become apparent upon reading the anexed detail description in connection with the drawings in which:

FIG. 4 is a view similar to FIG. 2 showing still another embodiment;

FIG. 5 is a sectional view taken along line 5—5 on FIG. 4;

FIG. 6 is a view similar to FIG. 2 showing a further embodiment;

FIG. 7 is a sectional view taken along line 7—7 of FIG. 6;

Figure 1:
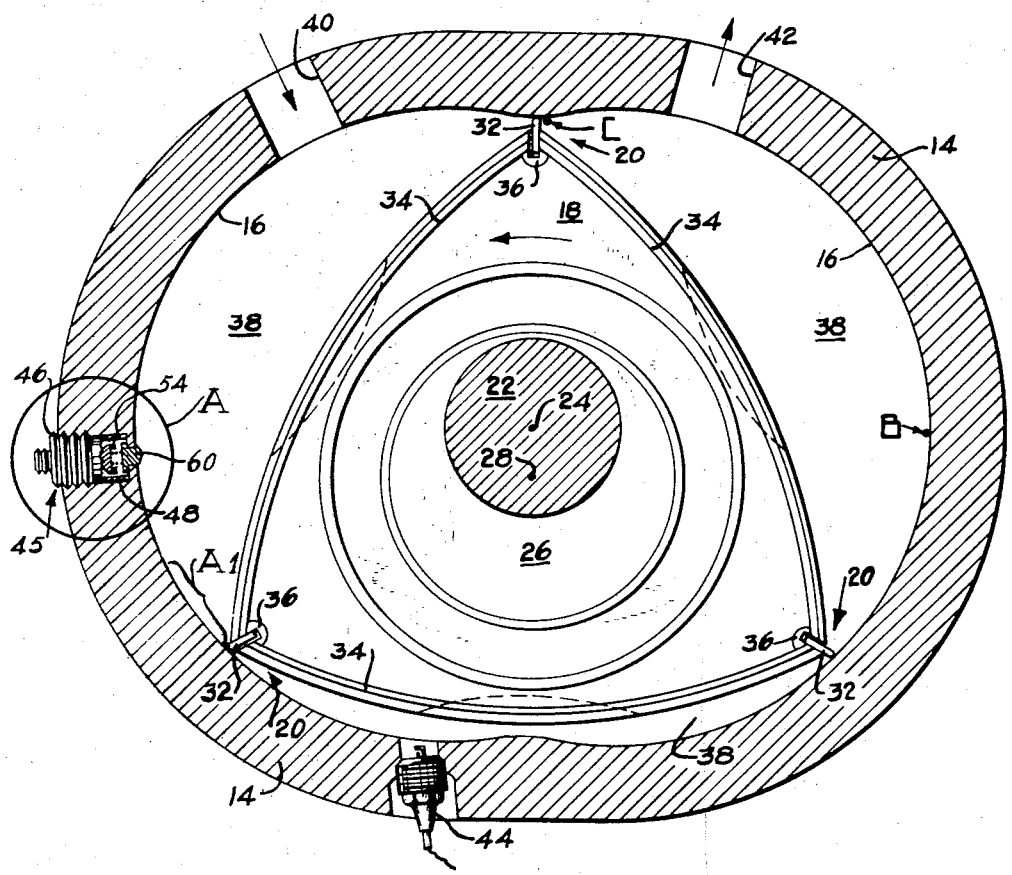
FIG. 1 is a diagrammatic transverse view of a rotary engine embodying the invention.
Figure 9:
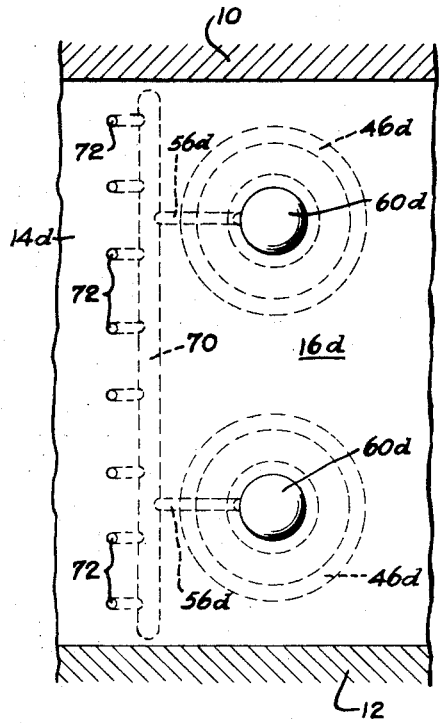
FIG. 9 is a sectional view taken along line 9—9 of FIG. 8.

Referring to the drawings, the housing or outer body of a rotary combustion engine comprises spaced end walls 10 and 12, as shown in FIG. 9, and a peripheral wall 14 as shown in FIG. 1 disposed between and interconnecting said end walls to form a cavity therebetween. The inner surface of the outer body comprises the inner surface 16 of the peripheral wall 14 and the inner faces of the end walls 10 and 12.

The inner surface 16 of the peripheral wall 14 preferably has a multilobed profile in cross-section which preferably is basically an epitrochoid.

Inside and eccentric to the housing is disposed an inner body or rotor having a plurality of circumferentially-spaced apex portions 20 about its outer periphery. A shaft 22, having an axis 24, which is coaxial with the axis of the outer-body cavity and along which the end walls 10 and 12 are spaced, extends through the outer body and is journaled in bearings (not shown) carried by the end walls 10 and 12. The shaft 22 has an eccentric portion 26 on which an inner body or rotor 18 is journaled, the axis of the inner body 18 and the eccentric 26 being indicated at 28.

Each of said apex portions 20 has radially-movable apex seal means 32 received within a single outwardly-facing groove 30 extending in a direction parallel to the rotor axis from one end face to the other of the rotor 18 and urged radially outward by spring means 33 into sealing engagement with the peripheral wall inner surface. The inner body 18 also has end faces having end-face seals means 34 and intermediate seal elements 36 disposed in sealing engagement with the end walls 10 and 12 which together with the apex seals 32 forms a plurality of working chambers 38 which vary in volume upon rotation of the inner body 18 relative to the stationary outer body.

During rotation of the inner body 18, the apex seal means 32 slide continuously along with their contact edges in bearing against the inner surface 16 of the peripheral wall 14, and the intermediate seal elements 36 and end face seal strips 34 slide continuously along the flat inner surfaces of the end walls 10 and 12. In order to maintain the relative motion of the inner body 18 relative to the stationary outer body an internal gear (not shown) is secured to the inner body coaxially with the inner body axis 28 and is disposed in mesh with a fixed gear (not shown) secured to the outer body coaxial with the outer body axis 24.

The outer body has intake port means 40 for supply of an intake charge to the working chambers 38 and has exhaust port means 42 for discharge of exhaust gases from the engine. If needed, a suitable spark plug 44 may be provided to ignite the intake charge.

The engine so far described is substantially similar to the engine disclosed in the aforementioned United States Patent Number 2,988,065 and for additional description reference is made to said patent. The seal arrangement so far described is substantially similar to the seal arrangement disclosed in United States Patent Number 3,033,180 and reference is made to said patent for further description of said seal means.

In FIG. 1, the apex-seal lubricating means 45 is shown as an integral part assembled in the outer body where it does not require special supporting structure and where it is not subject to rotor vibration and acceleration forces.

Figures 2, 3:
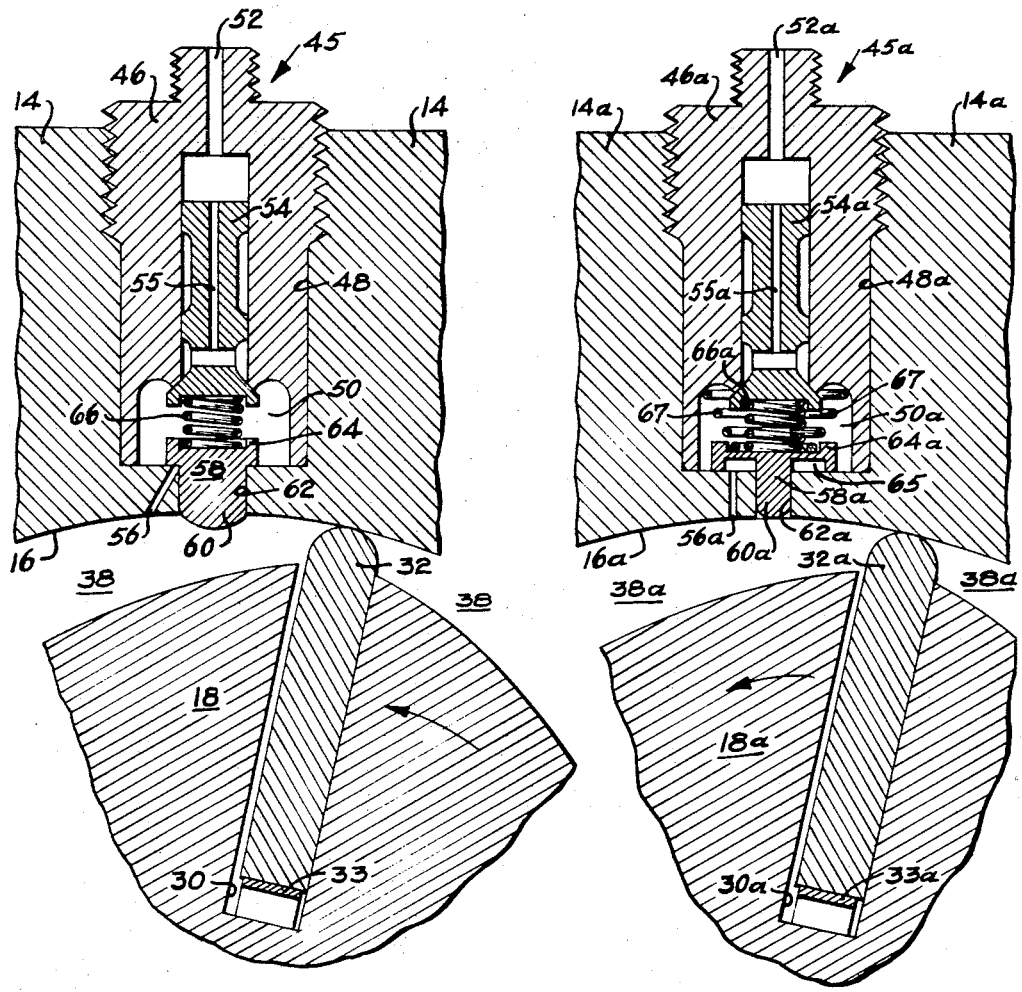
FIG. 2 is an enlarged view of circled portion A of FIG. 1.
FIG. 3 is a view similar to FIG. 2 showing another embodiment of the invention.

Three different forms of apex-seal lubricating means are illustrated in FIGS. 2, 3 and 6. In FIG. 2, the outer body has a cylindrical member 46 threaded into a bore 48 in its peripheral wall 14 at the bottom of which is a recess 50 which functions as a small storage space or reservoir for lubricating oil. The cylindrical member 46 has a coaxial oil-supply passage 52 connected to an oil supply source (not shown) for feeding oil into the recess 50. The oil-supply passage 52 has a check valve 54 disposed where it enters into the recess 50, which admits oil to the recess 50 through a passage 55 passing through the check valve 54 when the pressure therein drops below a predetermined value. The outer body also has flow-control means with discharge passage means 56 extending from the recess 50 through the peripheral-wall inner surface for intermittently controlling the flow of lubricating oil from the recess 50 through the oil-discharge passage means 56 in order to lubricate the inner surface 16 and the apex seals 32.

In FIG. 2, the oil flow-control means comprises a valve member 58 having a flange or head portion 64 to overlie and close the passage 56 and to open the passage when the valve head 64 is raised or lifted. The valve 58 also has an inwardly extending actuating stem portion 60 disposed within a bore 62 in the peripheral wall and projecting inwardly beyond the peripheral-wall inner surface 16, such that the valve member 58 is lifted or raised by an apex seal 32 against a spring 66 to open the oil-discharge passage 56 each time an apex seal 32 passes across the valve member. Thus, the valve member is opened a number of times in each revolution of the rotor equal to the number of rotor apex seals 32 or portions 20, whereby intermittent oil releases are automatically supplied to the apex seal means 32 by this mechanically-actuated valve 58. The actuating portion 60 of the valve member 58 of this embodiment protrudes radially inside the peripheral-wall inner surface 16 when it is in a closed position. This mechanical-type valve member 58 releases oil to the inner surface in front of the apex seal 32 as the actuating portion 60 is lifted upon contact with each passing apex seal 32, and each quantity of oil released to the oil-discharge passage 56 and injected into the chamber 38 is proportional to the outward force exerted thereon by each apex seal 32. When the actuating portion 60 fully protrudes, the valve member 58 is fully closed; and when the actuating portion 60 is lifted so that it is flush with the inner surface 16, the valve 58 is then fully open; and when partly lifted and partly protruding, the valve 58 is partly open. After each discharge of oil from the recess 50 the valve 58 closes as the apex seal moves off its protruding end and the check valve 54 opens in response to the pressure differential of the oil in supply passage 52 and the pressure in the recess 50 to refill the recess 50.

The apex-seal strips are urged in a radially outward direction not only by the spring means 33 but also by the force of the gas pressure in the adjacent working chamber having the higher pressure. This latter gas pressure acts radially outwardly under each apex seal. Thus, the magnitude of the radially outward force on each apex seal means 32 increases with increase in engine load and therefore the magnitude of the lift of the valve 58 by each apex seal means likewise varies with load. Hence, oil flow is governed by both engine speed and load, and regulated by a valve member 58, which is operated by the action of the apex seal 32 itself. Also, at constant speed, oil injection varies with engine load; while at constant load, oil injection varies with engine speed.

At any substantial load of the apex seal against the protruding actuating portion, the valve member is lifted fully and the apex seal remains in contact with the peripheral wall so that there is no gas leakage between chambers. At light load, the valve is only partly lifted and the apex seal is not flush with the peripheral-wall inner surface so that although some leakage can then occur across the apex seal, this is not detrimental at light loads.

The amount of oil injected each time the valve 58 is raised obviously is proportional to the magnitude of the lift of the actuating portion 60. Since the recess 50 is full of oil upon injection, the actual volume of oil injected for each valve actuation depends primarily on the volume displaced by the plunger or stem as it lifts.

In FIG. 2, the spring means 66 is disposed between the check valve 54 and valve member 58 to urge them apart toward their closed positions. The spring means 66 is designed and calibrated to suit the variable apex-seal radial force so that the valve member 58 properly opens, and to suit the oil pressure in the oil-supply passage 52 which is maintained so that the check valve 54 opens when the pressure differential across the check valve reaches a predetermined value. The type of spring 66 used is not critical, and other types are suitable for valve member 58 and check valve 54. Also by suitable spring design, if desired one can have no lubrication at idling and no-load conditions. In addition, oil drip or drainage from the recess 50 to the peripheral-wall inner surface 16 is minimized at shut-down. Thus, if an apex seal 32 should stop opposite the actuating portion 60, only some of the oil in the recess 50 would drain, or by suitable design of the valve spring 66 the pressure of the apex-seal 32 at shut-down would not lift the actuating portion 60 to permit oil drainage.

The preferred location for the embodiment of the apex-seal lubricating means 45 in FIG. 2 with a mechanical-type valve 58 in a conventional air-throttled engine, that is, an Otto-type engine having a variable throttle valve in the engine air intake, is in the cold lobe of the inner surface 16 in the region between the intake port 40 and spark plug 44 and upon or just beyond, in the direction of rotor rotation, one end of the major axis of the multilobe profile of the inner surface 16. For example, the valve 58 preferably is located at such region A in FIG. 1 so that oil is applied to the apex-seal 32 before it moves into the combustion region that is before the apex-seal reaches the region of both the highest gas pressure and temperature, and heaviest friction and wear. This preferred location is within the chamber 38 during its intake phase. At this location in a conventional air-throttled engine, the gas pressure of the working chamber varies in proportion to the engine load.

However, in an engine having no variable throttle valve in the engine air intake, as in a diesel, the pressure in the working chambers as they move through the region A would not vary with load. Hence, in such an unthrottled engine, the preferred location of the apex-seal lubricating means 45 is in a more downstream region indicated at A1 in FIG. 1. This region A1 extends from a point on the peripheral wall at which the trailing apex-seal of a working chamber is located when combustion is initiated therein to a point at which this apex-seal is located when said working chamber is in its top dead center position where the apex-seal lubricating means 45 is not subjected to the maximum gas pressures and temperatures which occur after the top dead center position of a working chamber.

Another location, indicated at region B in FIG. 1, which is suitable as an alternate location for the lubricating means 45 with the valve 58 in both a throttled and unthrottled engine is in the hot lobe prior to the exhaust port 42 and upon or near the major axis as indicated at region B in FIG. 1, where the chamber gas pressure likewise varies in proportion to the engine load.

Still another location, indicated at region C in FIG. 1, which is suitable as an alternate location for the valve 58 in both a throttled and unthrottled engine is at the minor axis or waist portion of the inner surface profile between the exhaust port 42 and the intake port 40, but at this location, illustrated at position C in FIG. 1, the necessary variation of gas pressure with engine load is not as pronounced as at the locations A, A1 and B in FIG. 1.

In FIG. 3, another embodiment of the apex-seal lubricating means 45a is shown which is similar to that in FIG. 2. For ease of understanding, the parts of FIG. 3 corresponding to the parts of FIGS. 1 and 2 have been designated by the same reference numerals but with a subscript a added thereto. The chief difference is that its actuating portion 60a is flush with the inner surface 16a when in a closed position instead of protruding. Here, the apex-seal 32a is not required to lift the actuating portion 60a. The actuating portion 60a is always clear of the passing apex-seal strips 32a, and is lifted solely by gas pressure pressing on its end face. The actuating portion 60a is flush with the peripheral-wall inner surface 16a when the valve member 58a is in a closed position, and when the actuating portion 60a is lifted or pushed radially outward by the working chamber gas pressure upon its end face, the valve member 58a is opened. Due to the increase in the oil pressure in the recess 50a and the simultaneous opening of the passage 56a caused by the lifting of the actuating portion 60a and flange 64a of the valve member 58a, a quantity of oil is released which is proportional to the radial gas pressure force on the valve actuating stem 60a, so that the quantity of oil injected to the inner surface 16a is also proportional to both engine speed and load.

After each discharge of oil from the recess 50a the valve 58a closes and when the pressure in the adjacent working chamber 38a drops sufficiently the check valve 54a opens in response to the pressure differential of the oil in supply passage 52a and the pressure in the recess 50a to refill the recess 50a.

In both embodiments shown in FIGS. 2 and 3, the quantity of oil released is regulated by the gas pressure in the working chamber, that is, indirectly in the mechanical-type valve member 58 in FIG. 2 and directly in the gas-piston valve member 58a in FIG. 3. The preferred location and best alternate locations would therefore be the same for both embodiments, and these locations, which depend on the type of engine throttle, were described previously.

In FIG. 3 as in FIG. 2 a common spring 66a urges both valves 54a and 58a in a closing direction. In addition, in FIG. 3 a separate spring 67 is provided to urge the valve 58a in a closing direction. In this way the spring 66a can be made quite light.

The head 64a of the valve member 58a in FIG. 3, as in FIG. 2, opens and closes the oil discharge passage 56a as the valve 58a rises and returns, the head having a downwardly extending peripheral flange for seating. This head has an annular groove or recess 65 between the valve stem and the flange on the side of its discharge passage 56a and communicating with the passage 56a when the valve is closed. With this groove construction on the last portion of the return stroke of the valve 58a some of the oil trapped in the groove will be forced through the oil passage 56a because of the resistance to backflow around the outer edge of the valve head or flange 64a, thus providing a second, lesser oil injection.

FIG. 4 shows an embodiment of an apex-seal lubricating means 45b similar to FIG. 3, except having a passage 56b which is cut in the surface of the stem-like actuating portion 60b. For ease of understanding, the parts of FIGS. 4 and 5 corresponding to the parts of FIGS. 1 and 2 have been designated by the same reference numerals but with a subscript b added thereto.

In FIG. 4, the oil discharge passage 56b is formed by a single longitudinal groove in the stem outer surface disposed adjacent to its wall bore or opening 62b. Also, the springs 66b and 67b in this embodiment are illustrated as leaf-type instead of coil type. Both the passage 56b and springs 66b and 67b are also usable in the first embodiment in FIG. 2, as well as in the second embodiment in FIGS. 3 and 4. The use of a separate spring 67b against the check valve 54b and a separate spring 66b against the valve member 58b permits easier spring design and calibration.

FIG. 6 shows still another embodiment of the apex seal lubricating means 45c. For ease of understanding, the parts of FIGS. 6 and 7 corresponding to the parts of FIGS. 1 and 2 have been designated by the same reference numerals but with a subscript c added thereto.

The apex-seal lubricating means 45c in FIG. 6 includes an oil-discharge passage means 56c extending from the recess 50c through the peripheral-wall inner surface 16c. However, instead of having a valve member with an actuating portion like the valve member 58 of FIG. 2, it has a second, gas-passage means 68 which separately extends from the recess 50c through the peripheral-wall inner surface 16c and is circumferentially spaced a sufficient distance from the first, oil-discharge passage means 56c, so that when an apex seal moves under the apex-seal lubricating means it is momentarily disposed between the discharge ends of the passages 56c and 68. In addition, the apex-seal lubricating means 45c is disposed at a position in the outer body peripheral wall 16c such that when an apex is disposed between the discharge ends of its passages 56c and 68 the pressure in the working chamber on one side of the apex seal e.g. the passage 68 side is substantially greater than the pressure in the working chamber on the other side of the apex seal. Accordingly, each time an apex strip 32c passes between the two passage openings 56c and 68 the higher gas pressure in the working chamber communicating with the passage 68 is effective through this passage to force the oil out of the recess 50c and through the oil-discharge passage 56c and into the lower-pressure chamber. The quantity of oil injected is proportional to the gas-pressure differential, which in turn is substantially proportional to the engine load when properly located as described hereafter. Hence, oil flow is again governed by both engine speed and load, and regulated by a simple flow-control means with no moving parts.

In FIG. 6, as in the other embodiments, the check valve 54c opens when the pressure differential across the valve 54c is above a predetermined amount. After oil has been discharged from the recess 50c and an apex seal has moved beyond both passages 56c and 68 both passages will communicate with the same working chamber. When the pressure in this latter chamber drops below the oil supply pressure in the passage 52c its check valve 54c will open to admit oil into the recess 50c. Thus, when the gas pressure in the emptied recess 50c becomes lower than the oil-supply pressure and the check valve 54c opens, oil flows into the recess 50c to refill the recess. The passages 56c and 68 are sufficiently small and offer sufficient resistance to oil flow therethrough that when the recess 50c becomes filled with oil, the pressure in the recess is substantially the same as the oil supply pressure whereupon the spring 66c closes the check valve 54c. The oil remains in the recess 50c until an apex seal again moves between its discharge passages 56c and 68 whereupon the differential between the two passages again forces oil from the recess 50c through the passage 56c for lubrication of the peripheral-wall inner surface and apex seals.

The preferred location on the inner surface 16c for the differential-pressure type of apex seal lubricating means 45c in FIG. 6 is similar to the preferred locations indicated for the other two embodiments in FIGS. 2 and 3. When used in a throttle engine, the preferred location is at region A as illustrated in FIG. 1, that is, in the cold lobe of the inner surface 16c in the region between the intake port 40 and spark plug 44 preferably somewhat beyond the adjacent end of the major axis of the multilobe profile of the inner surface 16c. When used in an unthrottled engine, the preferred location is at region A1 in FIG. 1, which is, as illustrated, located downstream from region A in FIG. 1. At these locations, the oil is injected behind the apex seal strip 32c and is picked up by the succeeding apex seal strip since the chamber gas pressure is higher on the leading side than the trailing side of the apex seal strip 32c. Also, the lubrication is thereby applied just before the seal strip 32c is subject to the highest pressure, friction and wear during compression and combustion. The best alternate location for the mechanism of FIG. 6 in both throttled and unthrottled engines is at the other end of the major axis of the multilobe profile 16c, in the hot lobe region shown at region B in FIG. 1. In the region B, the pressure in the working chamber on the trailing side of an apex seal is higher than on the other side. Therefore, when the apex seal lubrication mechanism is located in the region B the oil is injected from recess 50c ahead of the apex seal strip 32c. Also, pressure, friction and wear on the seal strip 32c thereafter in the exhaust region is not as severe and therefore less lubrication of the apex seal is required than in the region following location A.

Figure 8:
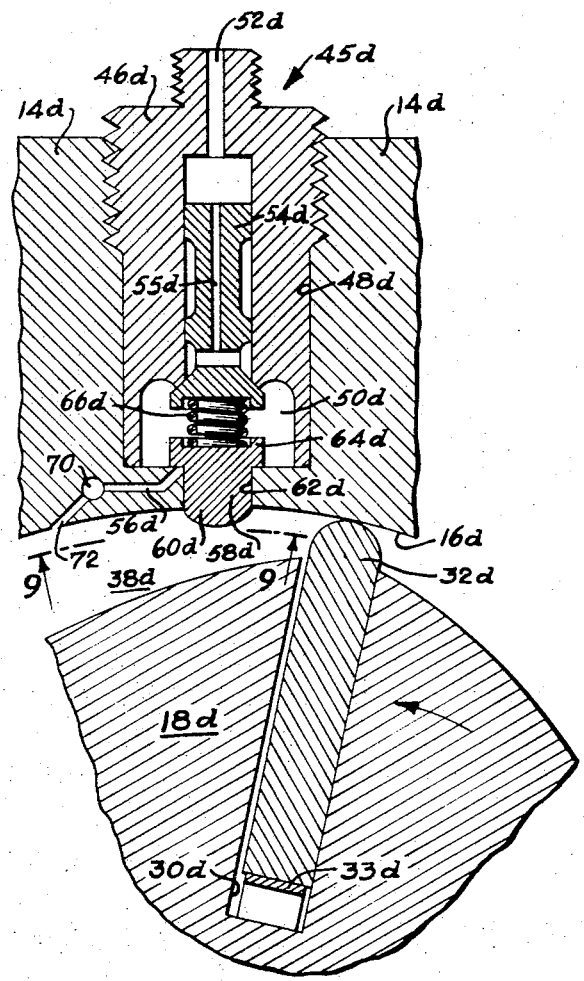
FIG. 8 is a view similar to FIG. 2 showing a similar embodiment with a modified passage means.

In FIGS. 8 and 9, the mechanical-type of apex-seal lubricating means 45d previously described and shown in FIG. 2 has oil passage means 56d including a distribution passage 70 connected to a plurality of discharge openings 72 through the peripheral-wall inner surface 16d, which is a feature applicable to all embodiments in FIGS. 2 through 7. For ease of understanding the parts of FIGS. 8 and 9 corresponding to the parts of FIGS. 1 and 2 have been designated by the same reference numerals but with a subscript d added thereto. The discharge openings 72 are preferably spaced axially-parallel for distributing oil evenly along the apex seal length for improved lubrication.

The apex seal lubricating means preferably is installed in the peripheral wall 14 as illustrated in FIGS. 2 through 9. Instead however, said apex seal lubrication means may be installed in the end walls 10 and 12. The peripheral wall location is preferred because the mechanical-type valve (FIG. 2) has an actuating portion 60 with its end edge protruding inside the outerbody inner surface 16 forming a ramp, and the rounded outer edge of the apex seal 32 slides over the ramp more easily than the squared end-edges of the apex seal 32 and intermediate seal member 36. The differential-pressure type of apex seal lubricating mechanism (FIG. 6) has two passages 68 and 56c extending from the recess 50c to the inner surface 16c and spaced apart a distance to allow one passage to be on each side of the apex seal 32c, and since the apex seal 32c is much thinner than the intermediate seal element 36 the small diameter passages are shorter and are less likely to coke or clog. The gas-pressure type of valve as shown in FIG. 3 (and also as shown in FIG. 4) operates equally well when disposed in either the peripheral wall 14a or end walls 10 and 12, but since it is primarily desired to lubricate the outer edge of the apex seal 32a, the most convenient location of the oil-discharge opening 56a and valve member 58a is adjacent to the apex-seal outer edge in the peripheral wall 14a. The lubricating oil from the openings 72 (FIG. 9) adjacent to the end walls 10 and 12 can also lubricate the adjacent intermediate seal members. If an apex seal lubricating mechanism is disposed in the end wall 10 or 12, it is preferably located radially outwardly of the path of the end face seals 34 and preferably in the path of the intermediate seal members 36 for their lubrication, and the preferred peripheral location is adjacent to its preferred location in the peripheral wall described previously.

The various improvements of the invention provide improved apex-seal lubrication during engine operation; prevent wasting of the oil; avoid mixing oil to the fuel; avoid metering devices connected to the engine drive; avoid clogging and coking of oil-supply passages; avoid acceleration and vibration forces of the rotor; provide oil injection to the seals automatically, efficiently and in a timed fashion; provide an integral pump and meter arrangement near the point of injection; and regulate oil injection in accordance with both engine speed and engine load.

While I have described my invention in detail in its present preferred embodiment it will be obvious to those skilled in the art after understanding my invention that various changes and modifications may be made therein without departing from the principle or scope thereof. It is intended by the appended claims to cover all such modifications.

What is claimed is:

1. A rotary mechanism comprising in combination an outer body having axially spaced end walls and a peripheral wall interconnecting said end walls to define a cavity in said outer body; an inner body disposed within said outer body for rotation relative to said outer body, said inner body having axially spaced end faces in sealing engagement with said end walls and a plurality of circumferentially spaced apex portions in sealing engagement with the inner surface of said peripheral wall, said inner body defining with said outer body a plurality of working chambers which vary in volume on relative rotation of said bodies with cyclical variation between higher and lower pressures in each of said working chambers during rotation; said outer body having an oil reservoir and oil discharge passage means communicating between said reservoir and said working chambers and a piston bore communicating between said reservoir and said working chambers; a resiliently loaded reciprocable piston disposed within said bore and having at one end a working face exposed to said chambers; said piston having at the other end a valve plate disposed within said reservoir and normally closing said oil discharge passage from said reservoir; said valve plate having on the side facing said oil discharge passage an annular recess in communication with said passage when said valve is closed; said piston and valve plate being responsive to said relative rotation and to said higher pressure portion of said cycle to open said discharge passage to said reservoir and to displace oil from said reservoir to provide a first discharge through said passage of said displaced oil, said piston and valve plate being further responsive to said relative rotation and to said lower pressure portion of said cycle to close said passage from said reservoir and to provide a second discharge through said passage of oil from said recess.

2. The combination of claim 1, wherein said reservoir has a supply conduit and check valve means disposed therein to prevent back flow through said conduit during oil displacement from said reservoir.

3. The combination of claim 1, wherein the working face of said piston in closed position is substantially flush with the inner surface of said peripheral wall.

References Cited by the Examiner

UNITED STATES PATENTS

| | | | |
|---|---|---|---|
| 952,707 | 3/1910 | Maximilian | 92—156 X |
| 1,321,340 | 11/1919 | Stoke | 230—207 |
| 1,347,959 | 7/1920 | McGann | 92—156 X |
| 2,289,441 | 7/1942 | LeValley | 230—152 |
| 2,540,714 | 2/1951 | Curtis et al. | 230—207 |
| 2,780,406 | 2/1957 | Feldbush | 230—207 |
| 2,824,687 | 2/1958 | Osterkamp | 230—207 |
| 3,106,197 | 10/1963 | Mallory | 239—87 X |
| 3,174,466 | 3/1965 | Scherenberg. | |

FOREIGN PATENTS 742,876   1/1933   France.

SAMUEL LEVINE, *Primary Examiner.*

JOSEPH H. BRANSON, Jr., *Examiner.*